Jan. 19, 1960 C. H. McSHAN 2,922,157
RADAR SIGNAL SIMULATOR
Filed March 30, 1954 7 Sheets-Sheet 6

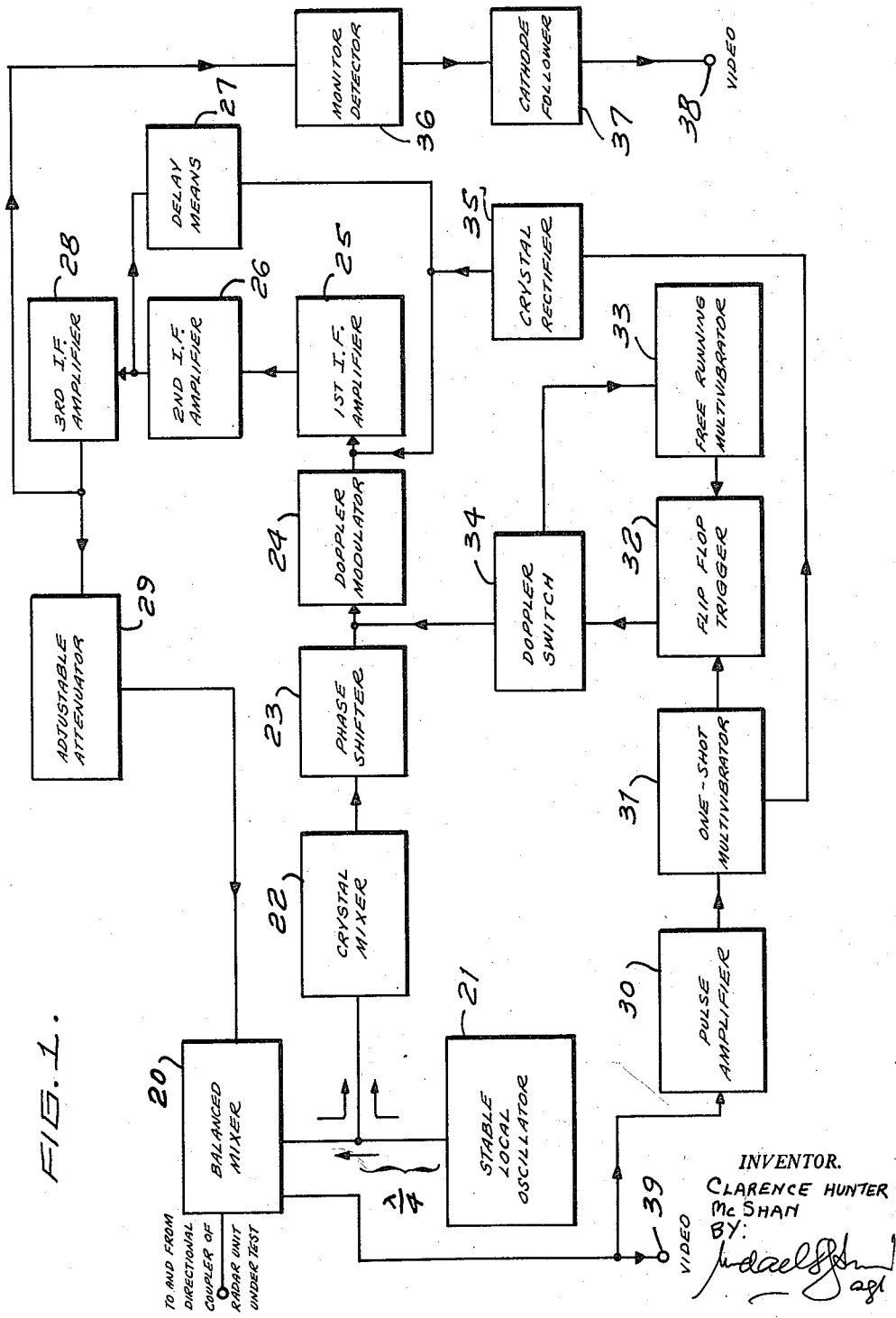

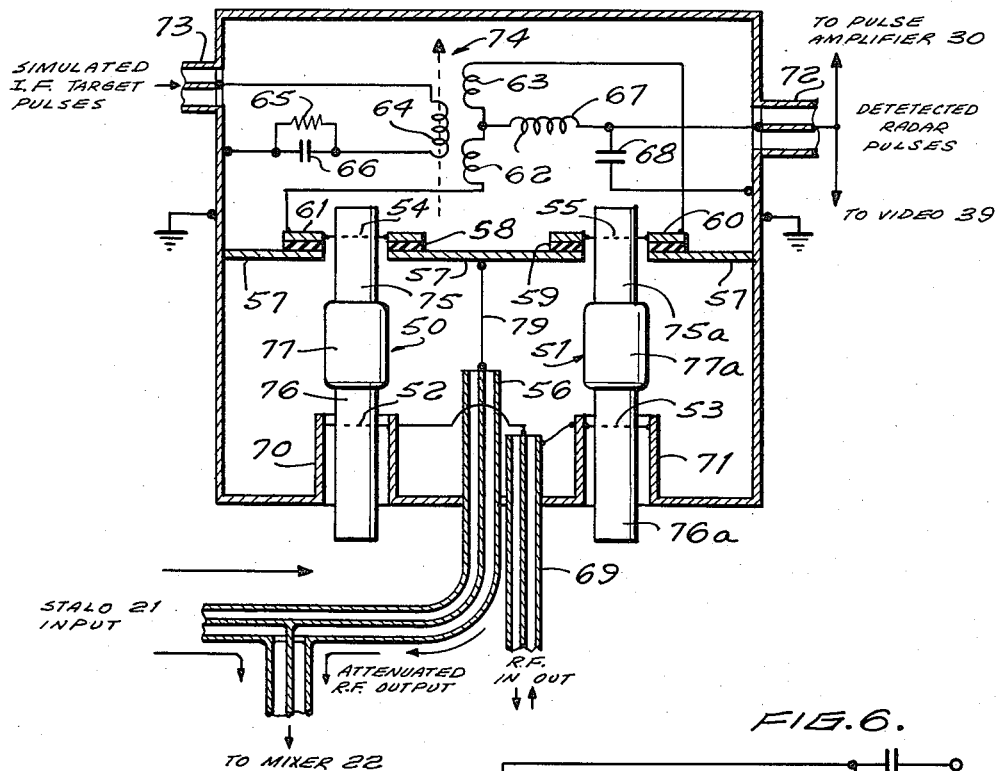
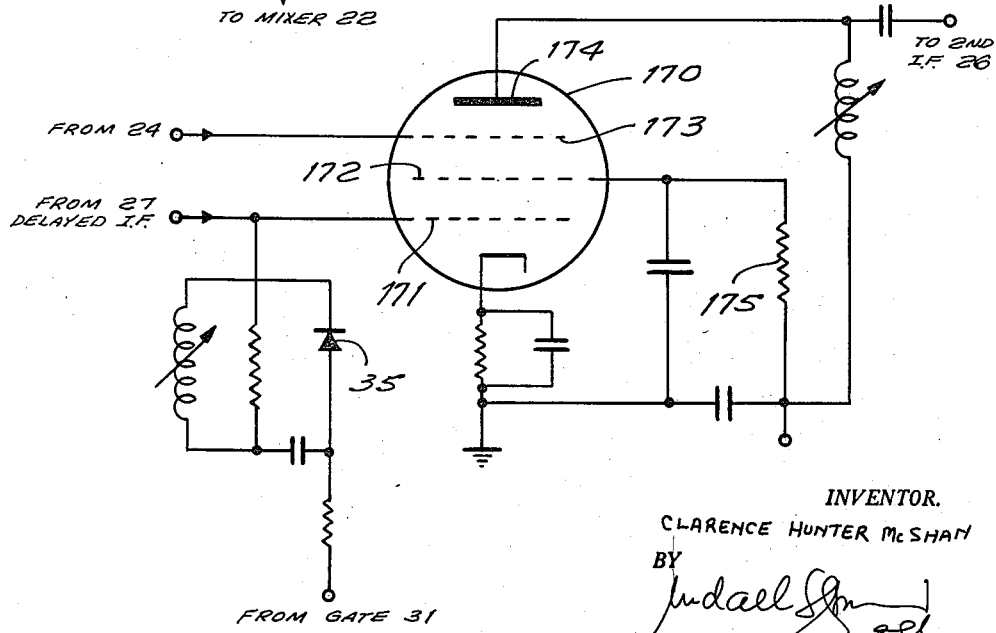

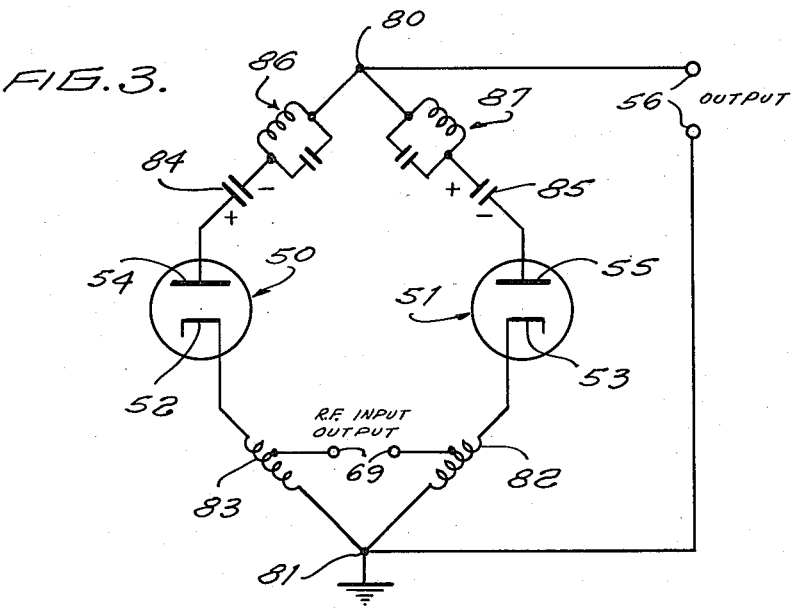
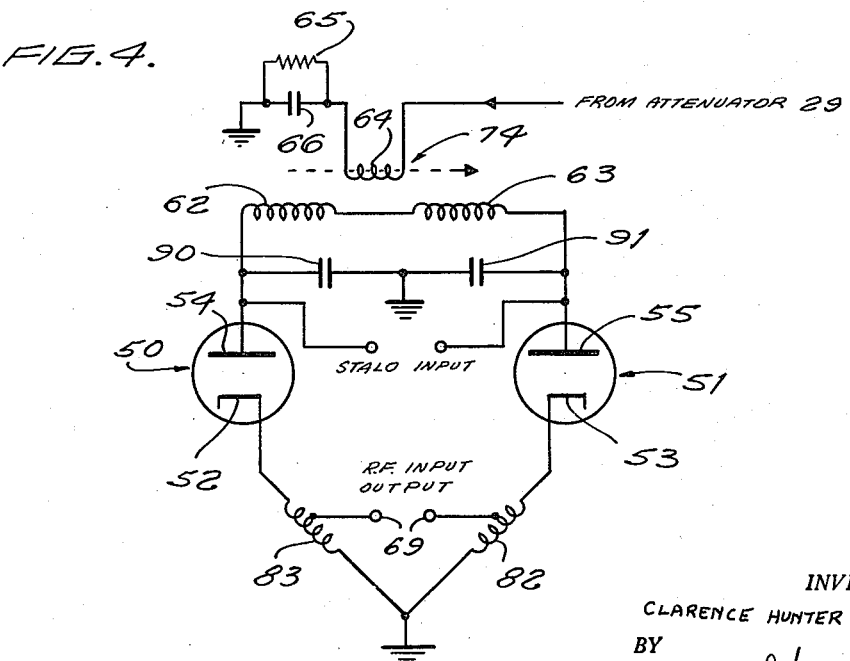

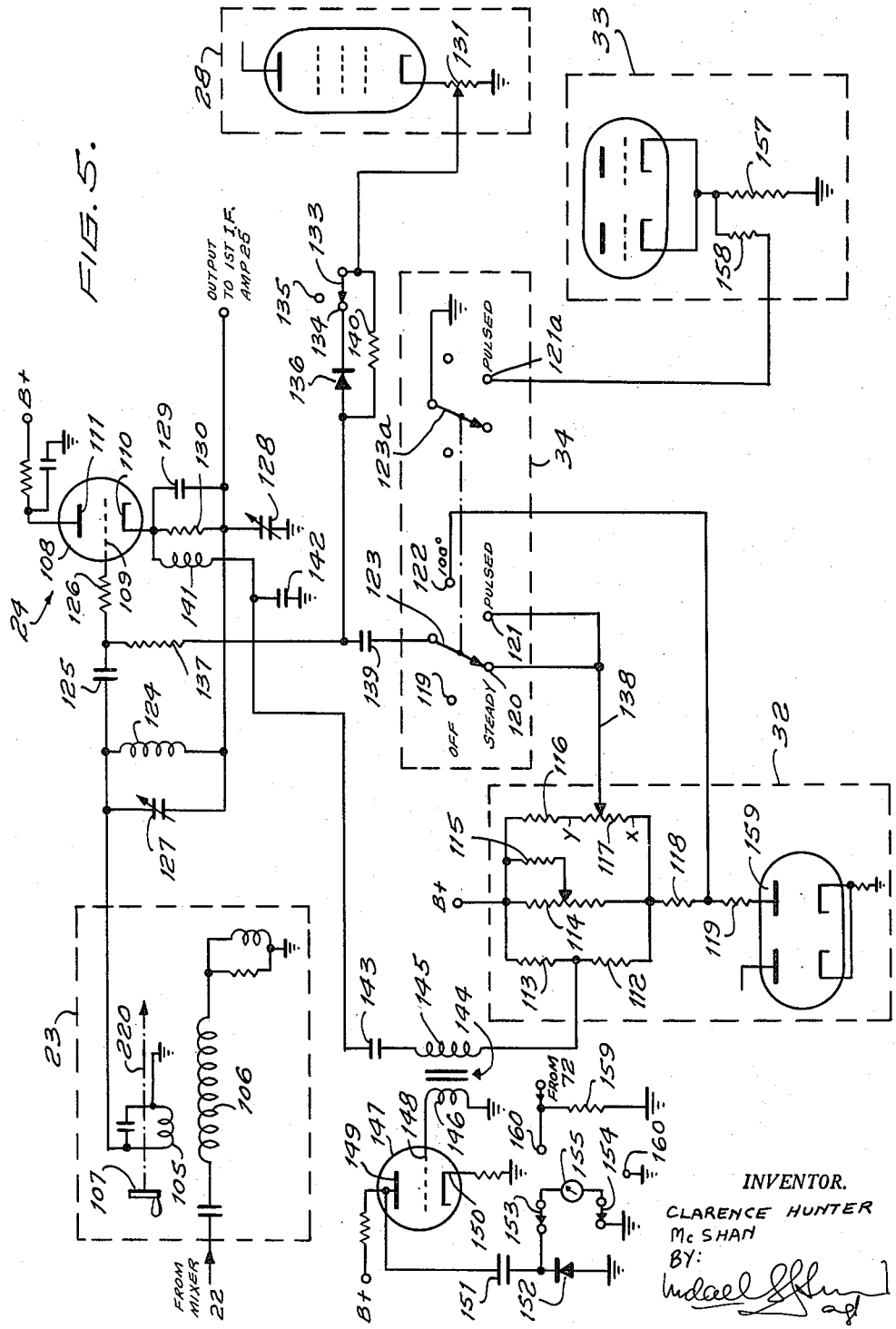

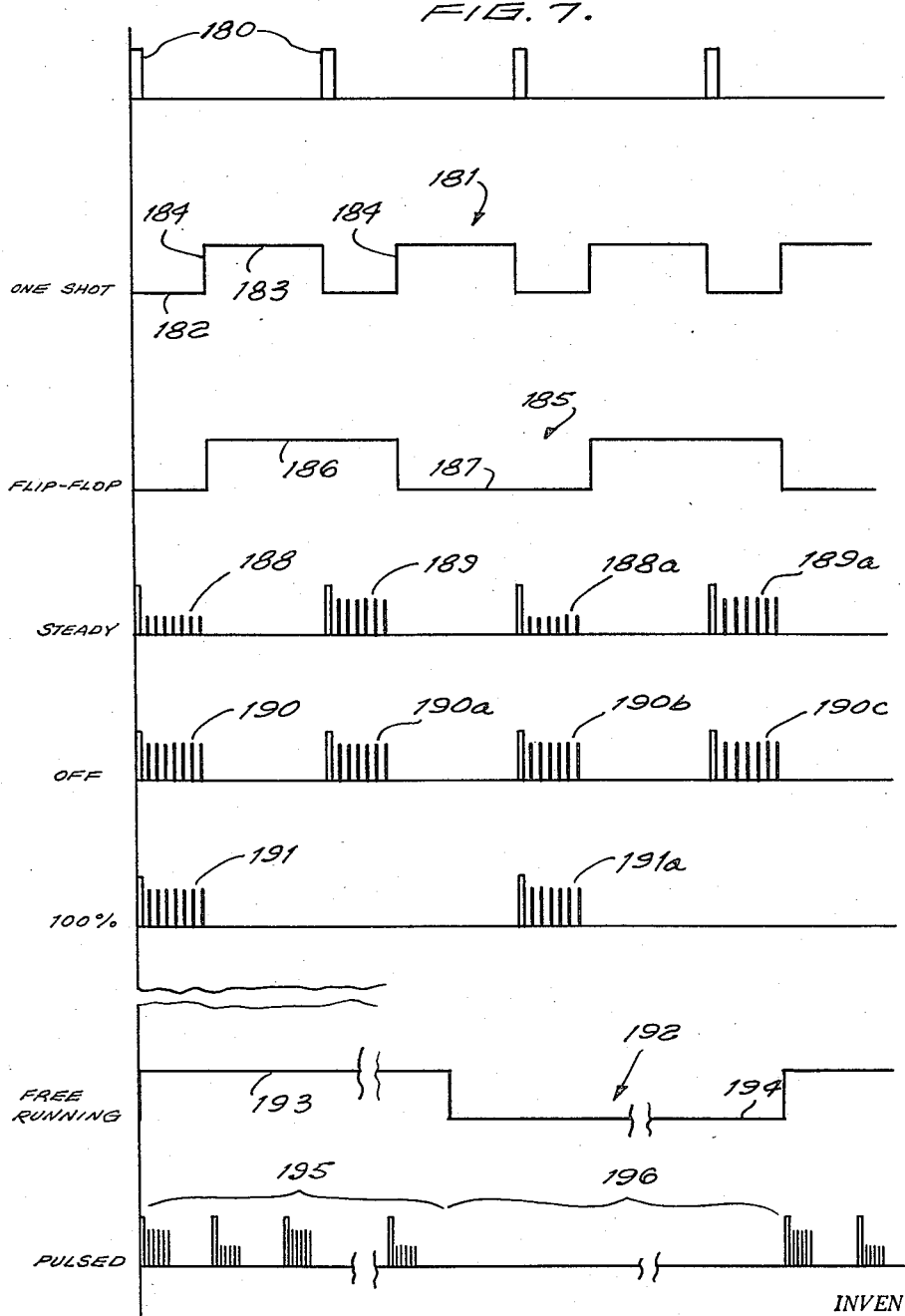

INVENTOR.
CLARENCE HUNTER McSHAN
BY

Jan. 19, 1960     C. H. McSHAN     2,922,157
RADAR SIGNAL SIMULATOR

Filed March 30, 1954     7 Sheets-Sheet 7

INVENTOR.
CLARENCE HUNTER McSHAN
BY

United States Patent Office 2,922,157
Patented Jan. 19, 1960

2,922,157

RADAR SIGNAL SIMULATOR

Clarence H. McShan, Great Neck, N.Y., assignor to Pitometer Log Corporation, New York, N.Y., a corporation of New York Application March 30, 1954, Serial No. 419,660

3 Claims. (Cl. 343—17.7)

The present invention relates to a test set for simulating radar echo signals and more particularly to a test set for simulating doppler-modulated echo signals.

It is a general object of the invention to provide a test set which is capable of measuring various operational characteristics of a radar unit of the moving target type (MTI).

A more specific object of the invention is to provide a test set capable of measuring sub-clutter visibility, that is, the strength of a moving target signal, relative to the fixed target clutter, which can just be detected and recognized as a moving target on a radar indicator.

Another more specific object of the invention is to provide a test set which may be used to check the accuracy of the radar range markers.

Still another more specific object of the invention is to provide a test set which may be used to view the shape of the transmitted radar signal and the shape of the simulated radar signals.

Another specific object of the invention is to provide apparatus for producing simulated doppler-modulated echo signals, the degree of doppler-modulation of which can be varied.

Another specific object of the invention is to provide a means of checking the output carrier frequency of a radar unit.

Another object of the invention is to provide an improved balanced modulator capable of attenuating received radio frequency pulses, detecting said received radio frequency pulses, and heterodyning intermediate-frequency pulses with the output of a local oscillator to produce simulated radio-frequency echo pulses.

A further object of the invention is to provide a novel phase modulation apparatus.

Still another object of the invention is to provide a new and improved delay line arrangement.

With the above objects in view, the present invention mainly consists of a radar signal simulator including means adapted to be coupled to the radar unit it is desired to test, for receiving therefrom carrier frequency radar pulses. Means are provided in the simulator for producing at least one retarded carrier frequency pulse in synchronism with each of the received radar pulses, respectively, and for shifting the phase of adjacent retarded carrier frequency pulses by a predetermined amount while maintaining alternate ones of the retarded carrier frequency pulses in phase.

In a preferred embodiment of the invention a plurality of carrier frequency pulses are produced in synchronism with each received carrier frequency radar pulse. These pulses are retarded given fixed amounts relative to one another. Adjacent groups of said retarded pulses are shifted in phase a given amount while alternate groups of said retarded carrier frequency pulses are maintained in phase.

In the preferred embodiment of the invention the received radio frequency radar pulses are converted to intermediate frequency pulses prior to the shifting in phase thereof. The phase shifting is produced by a novel phase modulating device comprising a cathode follower means having a capacitive load impedance across which the output signal is taken. The intermediate frequency retarded pulses are supplied to the cathode follower means and means are provided for changing the transconductance of the cathode follower in accordance with a given parameter of a modulating signal. This causes the output signal of the cathode follower means to be phase modulated in accordance with the foregoing parameter of the modulating signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a block diagram of a signal simulator in accordance with the invention;

Fig. 2 is a diagram, partially in cross-section and partially schematic, of the balanced modulator of the signal simulator;

Fig. 3 is a schematic diagram of the radio-frequency equivalent circuit of the balanced modulator illustrated in Fig. 2;

Fig. 4 is a schematic diagram of an intermediate-frequency equivalent circuit of the balanced modulator illustrated in Fig. 2;

Fig. 5 is a schematic diagram of a portion of the signal simulator illustrated in Fig. 1 including the doppler modulator, phase shift arrangement and various other circuit components;

Fig. 6 is a schematic diagram of the first intermediate-frequency stage of the signal simulator;

Fig. 7 shows the waveforms present at various points in the signal simulator;

In the drawing like reference numerals refer to like elements.

Figure 8:
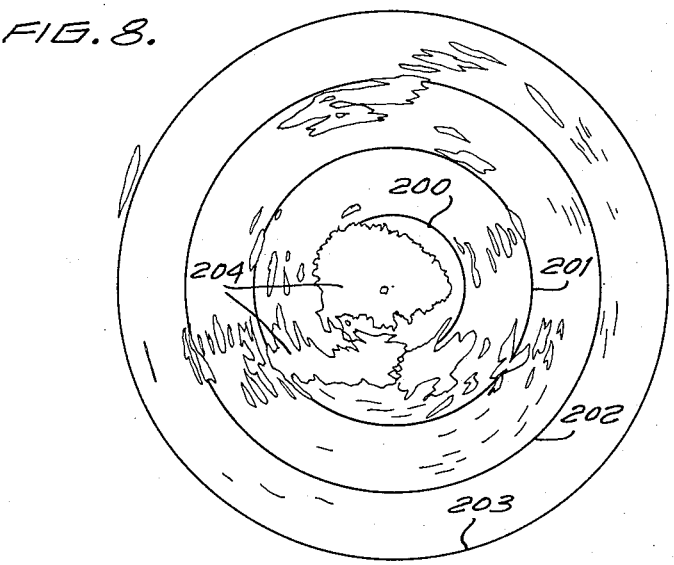
Fig. 8 is a drawing of a plan-position oscilloscope display of fixed targets simplated by the signal simulator.

Referring now to the drawing and more particularly to Fig. 1, there is shown a block diagram of the radar signal simulator including a balanced mixer 20 which is directly coupled to the directional coupler of a radar unit under test. (It is to be understood that the invention is equally applicable to the case where the balanced mixer is not directly coupled to the radar unit but is instead provided with antenna means or a pick-up loop of some other type for receiving a transmitted radar pulse.) Balanced mixer 20 attenuates the received radio-frequency pulses to a usable level. The output of the balanced mixer 20 and the output of the stable local-oscillator 21 are heterodyned in crystal mixer 22 to produce intermediate-frequency output pulses. Balanced mixer 20 also detects and attenuates the incoming radar pulses and supplies the detected pulses to pulse amplifier 30 and video jack 39. The wave shape of the detected radar pulses may readily be viewed by connecting a test oscilloscope to jack 39. The relative power level of these pulses may also be measured as will be explained below.

The intermediate-frequency radar pulses from crystal mixer 22 are fed through phase-shifter 23 to doppler-modulator 24 which shifts the phase of adjacent intermediate-frequency radar pulses as will be explained more fully below. This adds a moving target component to the simulated echo pulses. The output of doppler-modulator 24 is supplied to intermediate-frequency amplifiers 25, 26, and the output of second intermediate-frequency amplifier 26 is fed to a delay means 27 and thence back to the input of the first amplifier 25. The intermediate-frequency radar pulses circulate through the loop comprising blocks 25, 26 and 27 accumulating on each cycle a given time delay. In the signal simulator actually constructed, a delay of 61.8 microseconds was introduced by the delay means 27 so that the simulated echo pulses were spaced apart the equivalent of 5 nautical miles. After a predetermined number of circulations through loop 25, 26, 27, a gating pulse from one-shot multivibrator 31 is fed to the control grid of the first I.F. amplifier 25 through crystal rectifier 35 which terminates the circulation of pulses through the loop. In the signal simulator built, 10 or more simulated intermediate-frequency pulses were produced in response to each received radar pulse.

The output of third intermediate-frequency amplifier 28 is applied through adjustable attenuator 29 to the balanced mixer 20 where the trains of intermediate-frequency pulses are mixed with the output of stable local-oscillator 21 and converted to trains of simulated radio-frequency target pulses. The latter are applied directly to the directional coupler of the radar unit under test through the same lead as the radar input pulses are received. Of course, if an antenna is used, instead of being coupled directly to the radar unit, the simulated target pulses will be radiated toward the radar unit and the latter will receive these pulses on its own antenna.

The output of third intermediate-frequency amplifier 28 is also supplied to monitor detector 36 which is coupled to cathode follower 37. At point 38, there appears a video output of the simulated intermediate-frequency target pulses and these pulses may be viewed by connecting a test oscilloscope to 38.

Elements 30—33 comprise the signal simulator timing circuits. These perform a number of functions including gating of intermediate-frequency amplifier 25 to provide a desired plurality of simulated intermediate echo pulses in synchronism with each received radar radio frequency pulse; biasing of doppler-modulator 24 to produce phase shifts in the simulated moving targets; and pulsing action in order to facilitate measurement of sub-clutter visibility.

In brief, the timing circuits operate as follows: The balanced mixer 20 supplies detected radar pulses to pulse amplifier 30 which in turn triggers one shot multivibrator 31. In its quiescent condition, one half of multivibrator 31 conducts and the other half is cut-off. During its quiescent state, a steady bias is applied to the crystal rectifier 35 so that it conducts and effectively shunts the control grid to ground and thereby prevents the amplifier from amplifying any further signals applied by delay means 27. Upon the application of a pulse to multivibrator 31, the latter generates a negative-going gate which is applied to rectifier 35 causing said rectifier to be cut-off and thereby to provide a high impedance between the control grid of amplifier 25 and ground. During the negative gating interval, signals supplied to the control grid by delay means 27 are amplified. In a preferred embodiment of the invention, the negative gating interval is made sufficiently long to permit 10 or more simulated echo pulses to be produced in synchronism with each received radar pulse. The above gating action will be described in somewhat more detail below in connection with Fig. 6.

Flip-flop trigger 32 is a circuit having two conditions of stable equilibrium. In a preferred embodiment of the invention this trigger circuit comprises a multivibrator one-half of which conducts during one of the conditions of stable equilibrium and the other half of which conducts during the other of the conditions of stable equilibrium. The circuit remains in either of the two conditions, with no change in plate, grid or cathode potential, until some action occurs which causes the non-conducting section to conduct. The tube sections then reverse their functions and remain in the new condition until plate current flows in the cut-off section.

Flip-flop trigger 32 is triggered by one-shot multivibrator 31. Upon being triggered, circuit 32 generates a negative going square wave pulse in its output circuit which is applied to the control grid of doppler modulator 24 when doppler switch 34 is in certain positions.

The time relationship of the square wave outputs of one-shot multivibrator 31 and flip-flop trigger 32 is shown in Fig. 7, waveform 181 being the output of one-shot multivibrator 31 and waveform 185 the output of flip-flop trigger 32. As can be seen, the flip-flop trigger is actuated upon each occurrence of a positive-going leading edge 184 of waveform 181. The frequency output of the flip-flop trigger circuit is one-half that of the one-shot multivibrator.

Free running multivibrator 33 is placed in circuit in one position of the doppler switch 34. In this position, the cathode load impedance of the free running multivibrator 32 is reduced and the multivibrator oscillates at a predetermined rate gating the flip-flop trigger 32 at this rate. In an embodiment of the invention actually constructed, the free running multivibrator 33 had a symmetrical output wave at a frequency of about 5 cycles per second.

Referring now to Fig. 2, there is shown a diagram, partially in cross section and partially schematic, of the balanced mixer 20. It comprises a conductive shell 49 within which are mounted diodes 50 and 51. The diodes include tubular metal portions 75, 76 and 75a, 76a, respectively, and glass sections 77 and 77a, respectively. Radio-frequency radar input pulses are supplied through coaxial line 69 to sleeves 70, 71 and thence to the respective cathodes 52, 53. These sleeves act as distributed inductance elements as will be illustrated below. As can be seen, the input signals are applied in push-pull. The tube outputs at anodes 54 and 55, respectively, are fed through secondary windings 62 and 63, respectively, of intermediate frequency pulse transformer 74 and filter-coil 67 and capacitor 68, to coaxial line 72.

Attenuated radio-frequency pulses are coupled by means of loop 79 to coaxial line 56 and thence to the mixer stage 22 (Fig. 1). The capacitors comprise a circular disc 57, a pair of "Teflon" washers 58, 59 and a pair of conductive washers 60, 61.

Intermediate-frequency pulses from attenuator 29 are applied from coaxial line 73 to the primary winding 64 of intermediate-frequency transformer 74 and thence through windings 62, 63 to plates 54 and 55. Primary winding 64 is grounded to shell 49 through RC filter network 65, 66. The intermediate-frequency pulses are heterodyned in the balanced mixer to produce simulated radio-frequency target pulses at the radar frequency. The simulated target pulses are taken from cathodes 52, 53 and fed through coaxial line 69 back to the directional coupler of the radar unit under test.

The radio-frequency operation of balanced mixer 20 will be more readily understood by referring to Fig. 3 which is the radio-frequency equivalent circuit of the mixer. The balanced mixer is essentially a slightly unbalanced bridge circuit. Radio frequency input signals from the radar unit under test are applied to the cathodes 52, 53 of the diodes 50, 51 in push-pull through distributed inductances 82, 83. These distributed inductances are provided by the circular sleeves 70, 71 (Fig. 2) in which the diodes are mounted. In the test set actually built, a pair of type 6173 pulse diodes were employed for the balanced modulator tubes, however, it is to be understood that other types of tubes or nonlinear devices such as crystals are usable for the same purpose. The outputs of the balanced mixer tubes are supplied through capacitors 84 and 85 respectively to the cavity sections 86, and 87 respectively represented in the schematic diagram as tuned circuits. These cavity sections are provided by the hollow metal sections of the diodes as shown in Fig. 2. The attenuated output is taken between ground 81 and the junction 80 of the two resonant cavity sections. As can be seen from Figs. 1 and 2, the attenuated radio-frequency output pulses are supplied through coaxial line 56 to mixer 22 where the pulses are heterodyned with the output of stable local oscillator 21 to produce intermediate frequency pulses.

If the bridge circuit were perfectly balanced, the radio-frequency potential existing at the junction 80 of the two cavity sections would be exactly equal to that appearing at the junction 81 of the tube cathode inductances 82, 83. Under this condition, the radio-frequency output would be zero. Since, in practice, a slight unbalance always does exist, a radio-frequency potential difference also exists between points 80 and 81. In the test set built, it was found that the power level of the output radio-frequency pulses was about 25 db below the level of the input radio-frequency pulses (ratio of 316 to 1). As already mentioned, the attenuated radio-frequency output of the balanced mixer is carried by coaxial cable 56 to a junction point with the output of stable local oscillator 21. As shown in Fig. 1, this junction point is one-quarter wavelength removed from the stable local oscillator output circuit and this causes a very high impedance to be seen by the radar radio-frequency pulses looking into oscillator 21 and oscillator 21 is thus isolated from the output of the balanced mixer.

Fig. 4 is the intermediate-frequency equivalent circuit of the balanced mixer. Intermediate-frequency pulses from the intermediate frequency circuits are supplied to the primary winding 64 of intermediate-frequency transformer 74, through secondary windings 62, 63, respectively, of said intermediate frequency transformer and thence to the respective plates 54, 55 of diodes 50, 51. The output of the stable local oscillator 21 is supplied through coaxial line 56 to the respective anodes 54 and 55 of the balanced mixer. As can be seen, the balanced mixers are fed in parallel by the stable local oscillator. Capacitors 90, 91 represent capacitors 61, 58, 57 and 60, 59, 57, respectively (see Fig. 2). The intermediate-frequency pulses and the output of the stable local oscillator are heterodyned in balanced mixer 50, 51 producing simulated radio-frequency target pulses at precisely the frequency of the original radar radio-frequency input. These simulated radio-frequency target pulses are applied to the radar directional coupler through coaxial cable 69 (see Fig. 2).

The stable local oscillator circuit is not shown in detail since numerous arrangements known in the art may be employed. In the embodiment of the invention constructed, a lighthouse tube was used as the oscillator tube in a grounded-grid, coaxial line type arrangement. The output frequency of the stable local oscillator was made adjustable in the range of about 1190 to 1340 megacycles. This frequency band was required for the so-called L radar band which is 1215-1355 megacycles. It should be understood that the inventive concept is equally applicable to other frequencies and that in the case of higher radar frequencies other types of oscillator arrangements such as, for example, klystron oscillators or magnetron oscillators may be advantageously employed.

In the test set built, mixer stage 22 was a crystal mixer, however, other types of mixers known in the art may be employed instead.

Referring now to Fig. 5, there is shown a schematic diagram of phase shifter 23, doppler modulator 24, doppler switch 34, and portions of timing stages 31, 32 and 33.

Figure 10:
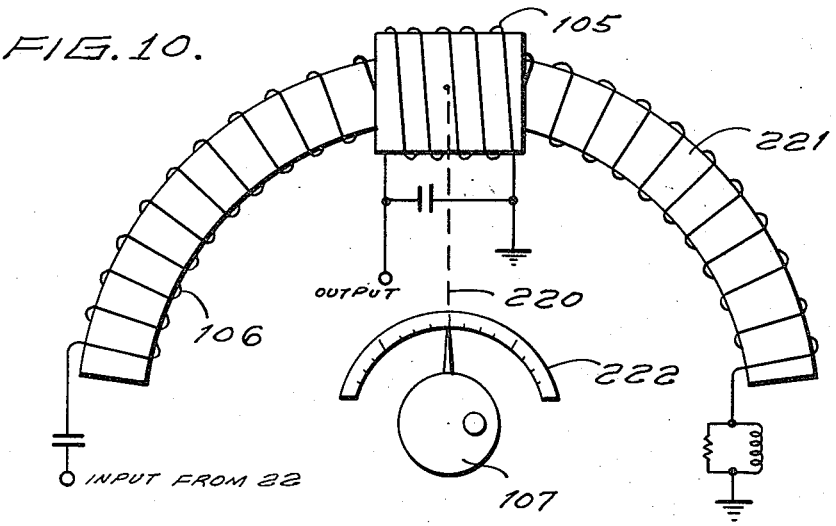
Fig. 10 is a diagram of the phase shifter shown in block form in Fig. 1.

Phase shifter 23 is a variable artificial transmission line which introduces a phase shift in the intermediate-frequency pulse output of mixer 22 prior to the application of the intermediate frequency pulses to doppler-modulator 24. The phase shifter is shown in greater detail in Fig. 10 which should also be referred to in the discussion which follows. As can be seen in Fig. 10, fixed coil 106 comprises a helix which is bent to have a circular axis and which is wound of many turns of fine wire. Axial strips of copper 221 provide distributed shunt capacitance which, combined with the distributed inductance of the coil, make the unit into a transmission line whose characteristic impedance in the embodiment actually built was about 500 ohms. The pick-up coil 105 is wound coaxially with the delay line and is adjustable in position so that the time of arrival of intermediate frequency pulses at the pick-up coil depends upon the distance of the pick-up coil from the input end (the end fed by mixer 22) of fixed coil 106. By varying the position of the pick-up coil, the signal delay can be varied up to about 0.029 microsecond, which is equivalent to an 180° phase shift at 17.5 megacycles, the intermediate frequency employed. The movable coil may be adjusted in position by turning a hand crank 107 which is mechanically coupled to the moving coil through a mechanical coupling shown schematically by the dashed line 220. The phase shifter may be calibrated by providing the hand crank with a pointer which is movable relative to a fixed scale 222. In the model of the test set constructed, the phase shifter was calibrated at 5° intervals.

It is to be understood that more conventional types of phase shifters may be employed instead of the one described above. These conventional arrangements include a fixed artificial delay line and a conductive wiper which is movable along the length of the delay line. An important advantage of the arrangement described above is the almost total absence of noise as the movable coil is moved relative to the fixed coil. Another important advantage is that there is no danger that poor conductive connections will ever develop. Another advantage of the described arrangement is its infinite phase resolution. A final advantage of the described arrangement is that there is no touching of parts and therefore phase adjustments may be made smoothly and accurately.

Referring again to Fig. 5, it is seen that the intermediate frequency signal output of the phase shifter 23 is fed through coupling capacitor 125 and resistor 126 to the control grid 109 of the doppler-modulator tube 108. The doppler modulator varies the phase angle of the intermediate frequency signal. In the Off-position 119 of doppler switch 34, the bias signal supplied to control grid 109 of tube 108 remains the same and therefore the phase angle of successive intermediate frequency pulses also remains the same. In the Steady position 120 of switch 34, a square wave signal 185 (Fig. 7) is applied to the control grid 109 which causes a phase shift between adjacent trains of intermediate frequency pulses. The amount of phase shift depends upon the amplitude of the square wave signal which in turn depends upon the values of resistors 112—119 and the setting of potentiometer arm 138. In the Pulsed position 121 of doppler switch 34, free running multivibrator 33 is actuated and the action of doppler modulator 24 alternates between the Off and Steady conditions at a rate of about 5 cycles per second. In the 100% position 122 of doppler switch 34, the output of flip-flop trigger 32 is applied with less attenuation to the control grid of the doppler modulator 24 and cuts said modulator off and therefore the train of intermediate frequency pulses on alternate pulse periods.

Doppler modulator 24 is a cathode-follower with a capacitive load 128. As already mentioned, intermediate-frequency pulses from phase shifter 23 are applied to the control grid 109 of the doppler modulator. In operation, the phase shifter 23 is adjusted to provide maximum phase detector response of the MTI radar receiver. This control, of course, is effective only for simulated moving targets. Adjustable capacitor 127 tunes inductance 124 and the tube and circuit stray capacitances to prevent the intermediate frequency pulses from feeding directly to the cathode of tube 108. The capacitance cathode load 128 is in series with the internal tube impedance and the two form an RC phase shift network. The reactance of condenser 129 is negligible at the intermediate-frequency so that lead capacitor 128 is effectively connected from the cathode 110 to ground and constitutes the cathode load. After initial calibration, variable capacitor 128 remains fixed and changes in phase angle are effected by varying the resistive component, that is, the tube resistance. This tube resistance is varied by changing its grid bias periodically by means of the output square wave of flip-flop trigger 32.

The quiescent operating condition of doppler modulator 24 and also its condition of minimum internal tube impedance are set by a combination of cathode and grid bias. The cathode bias resistor of the doppler modulator 24 is resistor 130 and the latter's D.C. return path is through coil 124 and movable coil 105 to ground. In the test set constructed the minimum internal tube impedance was adjusted to provide a 27° phase angle shift relative to the phase of the applied intermediate frequency pulses. In adjusting the doppler modulator to its quiescent condition, switch arm 133 is thrown to contact 135 which position will subsequently be termed the "calibrate 1" position. In this position a small positive voltage is tapped-off the cathode bias resistor 131 of the third intermediate-frequency amplifier 28 and fed through resistors 140, 137 and 126 to the control grid 109 of the doppler modulator. The value of the voltage tapped-off determines the phase angle imparted to the intermediate frequency pulses during the quiescent condition of the doppler modulator. After the above adjustment is made, switch arm 133 is thrown back to position 134 which will hereafter be termed the "calibrate 2" position.

In operation, assume that doppler switch 34 is in the Steady position 120. A square wave from the plate 159 of flip-flop trigger 32 is generated in the plate load resistance network consisting of resistors 112—119. The square wave is taken from arm 138 of potentiometer 117 and applied through arm 123, coupling capacitor 139 and resistors 137 and 126 to control grid 109. The direct current component of the square wave is removed by condenser 139. The most positive portion of the resulting square wave is clamped by diode 136 at the quiescent bias voltage set by resistor 131. The negative portion of the square wave swings the grid of the doppler modulator negative causing an increase in its internal tube impedance and a change in the output signal phase angle. The amplitude of the square wave, which determines the extent of phase angle change, may be varied by varying the position of arm 138. In the X position, the amplitude of the square wave is maximum and in the Y position it is minimum. Accordingly, when arm 138 is in the X position, maximum phase angle change results and when in the Y position minimum phase angle change results. Since the greater the change in phase angle the greater the intensity of the simulated doppler target signals as viewed on the cathode ray oscilloscope of the MTI radar unit under test, it is convenient to calibrate potentiometer 117 in terms of decibels. In the test set constructed the values of the resistor elements in the output network 112—119 were so chosen that there was obtained at the X position a phase shift corresponding to −10 db and at the Y position a phase shift corresponding to −40 db. This test set also included a scale calibrated in decibels so that phase shifts corresponding to values between −10 db and −40 db could readily be obtained.

The output of the doppler modulator in the Steady position of the doppler switch is shown in Fig. 7, waveforms 188 and 189. Since the bias applied to control grid 109 by the flip-flop trigger 32 is different during adjacent pulse periods (see waveform 185, Fig. 7), the amplitudes of succeeding pulse trains 188, 189 are different. Since the MTI radar under test includes means for limiting all received pulses to the same amplitude, this is of no consequence. There is a shift in phase of the intermediate carrier frequency of pulses 188 with respect to the phase of the intermediate carrier frequency of pulses 189, the extent of shift depending on the grid bias applied to grid 109. In the unit built, in the −10 db position of switch arm 138, the phase angle changes on succeeding pulse periods from 27° to 62° and back again for a phase shift of 35° and in the −40 db position of switch arm 138 the phase shift was approximately 1°.

In the Pulsed position of doppler switch 34 the second bank of the switch is thrown to position 121a. In this position the normal relatively high cathode load resistor 157 of free running multivibrator 33 is shunted by resistor 158 which is of relatively low value. In the embodiment of the test set built resistor 157 was 100,000 ohms and resistor 158, 1,800 ohms. As shown in Fig. 1, the output of free running multivibrator 33 is coupled to flip-flop trigger 32 and causes the flip-flop trigger to be cut off 5 times per second. The output waveform 192 of the free running multivibrator is shown in Fig. 7. It includes a positive-going half cycle 193 which is 1/10 of a second long and a negative-going half cycle 194 which is also a tenth of a second long. During the positive-going half cycle 193, the output of the doppler modulator is the same as when the doppler switch is in the steady position as indicated by successive wave trains 195 (Fig. 7). During the negative-going half cycle, the free running multivibrator causes the flip-flop trigger to supply a sufficiently negative signal to the doppler modulator to cut the latter off. Accordingly, during this interval, corresponding to interval 196 (Fig. 7), there are no intermediate-frequency pulses produced and therefore no simulated radio-frequency target pulses produced. The use of the Pulsed simulated signals will be discussed below.

In the 100% position 122 of doppler switch 34, the square wave output of the flip-flop trigger is taken from the junction of resistors 118 and 119. Accordingly, negative-going portions of the square wave are of much greater amplitude than in the Steady or Pulsed positions of switch 34. The resistor values are so chosen that the square wave is sufficiently negative to cut-off dopper modulator 24 during alternate pulse periods. The resultant output 191, 191a of the doppler modulator is shown in Fig. 7. Since in the radar unit under test the phase of pulses in successive trains is compared, it can readily be seen that there is maximum doppler response in the 100% position.

As already mentioned, in the Off position of doppler switch 34 there is no phase shift between successive trains of simulated target pulses. The resultant trains of output pulses are shown in Fig. 7 as waveforms 190-190c. These pulses are simulative of fixed targets.

Figure 11:
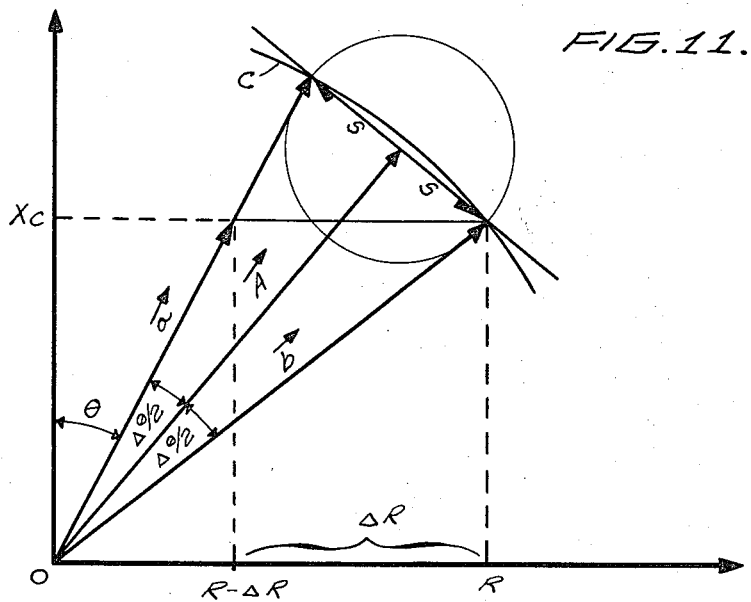
Fig. 11 is a vector diagram relating to the doppler-modulator shown in Fig. 5.

The theory of operation of the doppler modulator can more easily be understood by referring to the vector diagram shown in Fig. 11. Vector $a$ represents the 17.5 megacycle pulse signal through the doppler modulator with the doppler switch in the Off position. Its amplitude is $a$ and it is set at an angle of 27° from pure capacitive reactance by the fixed phase shift resulting from the RC phase shift in the cathode output circuit of the doppler modulator. This phase shift angle $\theta$ is seen in Fig. 11 to be:

(1) $$\theta = \arctan \frac{R - \Delta R}{X_c}$$

The $R - \Delta R$ factor is set by the resistive output impedance of doppler modulator 23, which depends upon the transconductance, $R - \Delta R = 1/gm$. (This is approximate; the exact value is $\mu + 1/r_p$.) The $X_c$ value is that of condenser 128 plus the shunting stray capacitances to ground. The values of $X_c$ and $1/gm$ are chosen so as to set $\theta$ to equal 27°, as shown in Fig. 11. In the test set constructed, a gm value of 4500 micromhos was chosen and condenser 128 has a value of 21.2 micro-microfarads (including stray capacitances, making the output resistance of tube 108,218.4 ohms. However, for the sake of mathematical simplicity, in the discussion which follows a gm value of 4000 micromhos and a capacitance value of 18 micro-microfarads are used. The theoretical discussion is, of course, applicable to any example.

When the gm value is set at 4000 micromhos:

(1) $\qquad 1/gm = R - \Delta R = 250$ ohms

Setting condenser 128 at 18 mmf. at an intermediate frequency of 17.5 mc. gives:

(2) $\qquad X_c = 500$ ohms (3) $\qquad \tan \theta = \dfrac{250}{500} = \dfrac{1}{2}; \; \theta = 27°$ The doppler modulator tube has its quiescent transconductance set at 4,000 micromhos during the "calibrate 1" setting, as will be explained below. This value represents both the quiescent value, and the operating maximum value, since in operation, the tube grid is pulsed negative from its quiescent bias. This negative grid drive brings the transconductance of the doppler modulator to a new lower value, and the tube cathode output resistance which is 250 ohms, represented in Fig. 11 by $R - \Delta R$ now rises to the higher value R, which corresponds to the new and lower transconductance of the doppler modulator during the period of the negative grid pulse. The vector $a$, which was the non-doppler modulated signal, with components $X_c$ and $R - \Delta R$, now shifts to the new position shown as vector $b$, whose phase angle corresponds to the component $X_c$ and R. The change of the resistant component $R - \Delta R$ to R shifts the signal phase through the angle $\theta$, which, as shown in Fig. 11, is the angle between vector $a$ and vector $b$. If the signals are limited to the same amplitude in the radar receiver or if means, not shown in any of the figures, are provided in the test set itself for limiting the amplitude of the signals, then both doppler and non-doppler modulated vectors can be taken as being equal, as shown in Fig. 11. It can be shown that the magnitude with which the vectors are assumed limited does not affect the sub-clutter visibility as long as complete limiting does occur and both doppler and non-doppler signals are limited to equal amplitudes. In the case of limited signals, the tip of the received vector will describe a circle C, shown in Fig. 11 to have a radius of length $b$, which is here taken as the limiting amplitude. When the doppler modulation is such that the vector output from the generator shifts through the angle $\Delta\theta$, then the MTI radar receives a signal whose center, or average position, is along vector A, the angle bisector of $\Delta\theta$. Vector A is a fictitious vector to the mid-point of the line joining the tips of vectors $b$ and $ka$, where $k$ is the scalar amplification required to bring the length of vector $a$ equal to vector $b$.

The MTI radar acts as though it were receiving a signal whose fixed component is vector A, with a doppler component vector S which has constant amplitude, but changes in phase to give the vectors $b$ and $ka$. An extended discussion of this action may be found in the volume "Radar System Engineering," by Ridenour, chapter 16. Assuming that there is maximum response velocity so that vector $ka$ represents the target return from one transmitted radar pulse, vector $b$ is the return from the next pulse, and the residue, or difference between successive return pulses, has a magnitude 2S. This is equivalent to assuming that the residue vector S shifts phase by 180° during successive pulse periods. The sub-clutter visibility can be defined as the ratio of half the residue amplitude to the clutter amplitude, or:

(4) $\qquad \text{SCV(sub-clutter visibility)} = S/A$

It is convenient to work with this figure in decibels, so that:

(5) $\qquad \text{SCV in db} = 20 \log_{10} S/A$

In the signal simulator, as explained above, the vector $a$ is shifted in phase to the position indicated by vector $b$ by an RC phase shifter operating at intermediate frequency. In this phase shifter $X_c$ is kept fixed and the R component is varied by an amount $\Delta R$, by changing the gm of the doppler modulator. An important factor which must be known and accurately controlled in order to obtain accurate known amounts of phase shift is the factor $\Delta R/R$ which gives the fractional decrease in output resistance of doppler modulator 24 from the large value of R which gives vector $b$, to the smaller value $R - \Delta R$ which gives vector $a$. Since the output resistance is approximately $1/gm$ for doppler modulator 24 we can say:

(6) $\qquad R \doteq 1/gm$ (7) $\qquad R - \Delta R \doteq 1/Gm$ where $gm$ is the lower and $Gm$ the higher transconductance of doppler modulator 24. Dividing, we obtain:

(8) $\qquad \dfrac{R - \Delta R}{R} \doteq \dfrac{gm}{Gm}$ or (9) $\qquad \Delta R/R = 1 - gm/Gm = \dfrac{Gm - gm}{Gm}$ Examination of the expression for $\Delta R/R$ shows that it represents the fractional increase in transconductance required to bring it from its low value, $gm$, to its maximum value, $Gm$, expressed as a fraction of its maximum value. For example, if $gm$ is 70% of the maximum $Gm$, then $\Delta R/R$ is 0.30. Using this fact, it is possible to determine the $\Delta R/R$ value, i.e., the change in transconductance required in doppler modulator 24 to shift the signal phase of vector $a$ to vector $b$ whatever the positions chosen for vectors $a$ and $b$.

The geometry of Fig. 11 can be used to compute the $\Delta R/R$ values which correspond to various sub-clutter visibility values $S/A$. Assume that vector $a$ is set to the angle $\theta$ with the X, or reactance Axis, and that vector $a$ has the component $X_c$ and $R - \Delta R$ along the reactance and resistance axes respectively. As explained above, by decreasing the transconductance of modulator 25, the resistive component is then increased from $R - \Delta R$ to R, producing vector $b$ as the modulator 24 output impedance. We call the angle between vector $a$ and vector $b$ $\Delta\theta$, and therefore vector A, which bisects this angle makes angles $\theta/2$ with vector $a$ and vector $b$. Vector A goes to the midpoint of the line joining the tips of vector $b$ and vector $ka$ (the residue), since vector $ka$ = vector $b$, and the bisector of the vertex angle of an isosceles triangle is the perpendicular bisector of the base. We can utilize the fact that vector A is perpendicular to the residue vector by saying:

(10) $\qquad S/A = \tan\left(\dfrac{\theta}{2}\right) = \text{SCV}$ an expression which relates the sub-clutter visibility with half the angle $\Delta\theta$ between vector $a$ and vector $b$.

To compute
$$\dfrac{\Delta R}{R}$$
still using Fig. 11, we write:

(11) $\qquad \tan \theta = \dfrac{R - \Delta R}{X_c}$ $$(12) \quad X_c = \frac{R - \Delta R}{\tan \theta}$$

and $$(13) \quad \tan(\theta + \Delta\theta) = R/X_c$$

Substituting for $X_c$, we obtain:

$$(14) \quad \tan(\theta + \Delta\theta) = R / \frac{R - \Delta R}{\tan \theta} = \frac{\tan \theta}{1 - \frac{\Delta R}{R}}$$

Solving for $$\frac{\Delta R}{R}$$

$$(15) \quad \frac{\Delta R}{R} = \tan \theta / \tan(\theta + \Delta\theta)$$

The angle $\theta$ we assume known and fixed by our previous choice of $X_c$ and $R - \Delta R$ or $1/Gm$. We can find the angle $\Delta\theta$ in terms of the sub-clutter visibility from the earlier equation:

$$(16) \quad \tan \frac{\Delta\theta}{2} = \text{SCV} = S/A$$

so $$\frac{\Delta\theta}{2} = \text{arc tan } S/A$$

and $$(17) \quad \Delta\theta = 2 \text{ arc tan } S/A$$

Using (17), we can put Equation 15 in a form allowing computation of $\Delta R/R$ in terms of the known quantities $\theta$ (set at 27 degrees), and $S/A$, the sub-clutter visibility:

$$(18) \quad \frac{\Delta R}{R} = 1 - \frac{\tan \theta}{\tan(\theta + 2 \text{ arc tan } S/A)}$$

From Fig. 11, we can see that the ratio $S/A$ will be the same, no matter to what length the two vectors along $a$ and $b$ are limited, since the figures so formed will, by the laws of similar triangles, have exactly the same proportions, and still yield sub-clutter visibility ratios equal to $S/A$.

Referring again to Fig. 5, there are shown calibration circuits which facilitate the calibration of the doppler modulator 24. The square wave pulse output of flip-flop trigger 32 appears also across cathode resistor 130 and is used in a comparison and metering circuit. This square wave pulse has a repetition rate one-half that of the radar pulse repetition rate and, even including the first twenty harmonics required for the square wave shape, it does not require a band pass of more than 8 kilocycles. Condensers 129 and 128 present a relatively high impedance to a signal of this frequency whereas coil 124 and movable coil 105 of the phase shifter present a relatively low impedance path to ground. The effective cathode load for the square wave pulse therefore is resistor 130 which in practice had a value of 500 ohms. Square wave pulses taken from the cathode 110 are filtered by coil 141 and condenser 142 and fed through coupling capacitor 143 to one end of the primary winding 145 of transformer 144. The amplitude of these pulses is a function of the transconductance of tube 108 and therefore of its grid voltage.

The other end of primary winding 145 receives a reference pulse of precisely one-half the amplitude of the pulse tapped off by arm 138 (known as the "subclutter visibility control") when the latter is in the X (−10 db position). This reference pulse is taken from the junction of resistors 112 and 113 which resistors are of the same size. The resultant voltage on the primary winding 145 represents the difference between the voltages applied to the respective ends of the primary winding. This difference voltage is coupled through secondary winding 146 to the control grid 148 of meter amplifier 147. The amplified difference voltage at the plate 149 is applied through coupling condenser 151 to rectifier 152. The rectifier rectifies the difference voltage and in the "calibrate 1" and "calibrate 2" position, switch arms 153 and 154 place microammeter 155 in circuit with the rectifier.

Two internal calibration adjustments are provided for the doppler modulator circuit. When in the "calibrate 1" position (switch arm 33 in contact with contact 135) resistor 131 may be adjusted to set the transconductance of doppler modulator 24 to the desired quiescent operating condition. Clamper diode 136 is disconnected for this adjustment so that the pulses received at the grid 109 will have positive as well as negative swings about the grid voltage set by resistor 131 and the transconductance measured will be the true dynamic value. When the calibration adjustment is made, doppler switch 34 is set at Steady and arm 138 is set at −14.8 db and resistor 131 is varied to obtain a null on meter 155.

The value 14.8 db may be derived mathematically if $gm$, $r_p$ and $R_k$ are known, where $gm$=tube transconductance, $r_p$=dynamic plate resistance, and $R_k$=cathode load resistance. In the unit built, $gm$=4500 micromhos, $r_p$=12,700 ohms and $R_k$=500 ohms.

When in the "calibrate 2" position (switch arm 133 in contact with contact 134), clamper diode 136 is connected normally and resistor 114 may be adjusted to set the transconductance of tube 108 to the correct value for the larger phase angle output. The symmetrical square wave output of flip-flop trigger 32, after having its D.C. component removed by condenser 139 and its positive peaks clamped to the voltage set by resistor 131, causes tube 108 to operate for half the time at the quiescent bias voltage and for the other half of the time at a bias value determined by the amplitude of the negative-going signal tapped-off by arm 138. Under these conditions, the comparison and metering circuit measures the average transconductance of tube 108, which, since the quiescent transconductance is fixed, is proportional to the transconductance of the tube for its larger phase angle output. When the calibration adjustment is made, arm 138 is set at −13.1 db and resistor 114 is varied to obtain a null on microammeter 155.

The detected radar pulses fed to coaxial cable 72 (Fig. 2) from the plate output of the balanced mixer circuit, in addition to being supplied to the pulse amplifier 30, are also applied across resistor 159 (Fig. 5). When switch arms 153, 154 make contact with contacts 160, microammeter 155 is placed in shunt with resistor 159 and in this position may be used to measure the power of the radar input pulses. This is a convenient means for measuring the day-to-day performance of the radar transmitter.

Fig. 6 is a schematic diagram of the first intermediate-frequency stage 25. In the embodiment of the invention built, the intermediate-frequency amplifiers were stagger-tuned to provide a 2–2.5 megacycle band width with a center frequency at 17.5 megacycles.

Referring now to Fig. 6, there is shown a pentode amplifier tube 170 having a control grid 171, screen grid 172, suppressor grid 173 and anode 174. The intermediate-frequency pulse output of doppler modulator 24 is supplied to the suppresser grid 173. The intermediate-frequency output of delay means 27 (Fig. 1) is fed to control grid 171. In a preferred embodiment of the invention, the delay means comprises a quartz delay cell, and, as already mentioned, each intermediate frequency pulse applied from the delay cell is delayed the equivalent of 5 nautical miles. The gating pulse from one-shot multivibrator 31 is applied through crystal diode 35 to the control grid 171 and is used to gate the tube on and off.

In operation, when a positive pulse is supplied to rectifier 35 it causes the same to conduct and this reduces the control grid circuit impedance to a low value, effectively shorting out the control grid. On the other hand, when rectifier 35 is not conducting, that is, during the negative-going portion of the output of 31 (portion 182 of waveform 181 as shown in Fig. 7), the grid impedance is raised to its normal value and tube 170 is in condition to amplify intermediate frequency signals supplied to its control grid. The negative pulse derived from the one-shot multivibrator is applied to rectifier 35 coincident with the arrival of an intermediate frequency pulse from doppler modulator 24. This negative pulse prevents the rectifier from conducting for a length of time sufficient to accumulate the desired number of intermediate-frequency pulses from quartz delay cell 27. At the termination of the operative interval, the gate pulse polarity reverses causing rectifier 35 to conduct and cut-off the intermediate frequency amplifier. This condition is maintained until the next succeeding radar pulse is received.

The gated output of the first intermediate frequency amplifier is capacitively coupled to the control grid circuit of the second intermediate frequency amplifier 26 (Fig. 1). The screen grid voltage of the second amplifier is adjustable. This permits control of the gain of the closed loop circuit 25, 26, 27. In a preferred embodiment of the invention, the loop gain is adjusted to unity so that all simulated target pulses have the same amplitude. However, if desired, the loop gain may be varied above or below unity. In the former case, a series of pulses of ascending amplitude is produced and in the latter case a series of pulses of descending amplitude is produced.

The third amplifier stage 28 is of conventional design and is not discussed here in detail. The output of the third amplifier is applied to monitor detector 36 and attenuator 29. As already mentioned, the detected intermediate frequency pulses may be viewed by connecting a test oscilloscope to jack 38 (Fig. 1).

In a preferred embodiment of the present invention, attenuator 29 comprises a so-called "piston attenuator" which is, in effect, a transformer having a mutual inductance which is determined by changing the physical spacing between the primary coil thereof and the secondary coil thereof. The induced voltage in the secondary coil is a function of the mutual inductance and therefore by varying the spacing of the coils an output voltage which is variable is obtained. In the embodiment constructed, the output attenuation was variable between 0 and 70 relative db. The output of attenuator 29 is applied to the primary winding 64 of transformer 74 as shown in Fig. 2.

Referring now to Fig. 7, there is shown the time relationship between waveforms at various points in the signal simulator circuit. Pulses 180 represent the received radar pulses. Waveform 181 is the output of one-shot multivibrator 31 and comprises a negative-going portion 182 the duration of which determines the conductive interval of intermediate frequency amplifier 25 and a positive-going portion 183 the duration of which determines the time interval the intermediate frequency amplifier 25 is effectively cut-off. As can be seen, the leading edge of each negative going square wave portion is coincident with radar pulse 180. The leading edge 184 of waveform 181 triggers flip-flop trigger 32 and causes it to produce an output 185 having a positive going portion 186 and a negative-going portion 187. The positive going portion 186 is clamped by means of diode clamper 136 (Fig. 5) at the level determined by the setting of resistor 131 (Fig. 2). The amplitude of the negative going portion 187 of waveform 185 is adjustable in accordance with the setting of arm 138 (Fig. 5) in the Steady and Pulsed positions.

As already explained, in the Steady position of the doppler switch pulse trains 188, 189, 188a, 189a result. Adjacent ones of the trains are of different amplitudes and different phase. Although each pulse train is shown in the drawing as comprising six pulses, this is merely for ease of illustration, it being understood that the number of pulses in each train is variable. Thus, for example, if desired each train may comprise only a single pulse, however, in a preferred embodiment of the invention each train comprises at least ten pulses. It should also be understood that although in the embodiment described the simulated pulses are spaced the equivalent of 5 nautical miles, it is possible to use any delay value desired.

In the Off position pulse trains 190–190c result. Adjacent ones of these trains are of the same amplitude and in the same phase.

In the 100% position alternate pulse trains are eliminated leaving pulse trains 191 and 191a.

The output of the free running multivibrator 33 is shown as waveform 192 including positive-going portion 193 and negative-going portions 194. This waveform and the one following are drawn to a different scale than the preceding waveforms. The free running multivibrator feeds its output to flip-flop trigger 32 which causes a pulsed pattern indicated by brackets 195, 196.

Fig. 8 illustrates a plan position (P.P.I.) display (20 mile range) with simulated fixed targets. These targets are indicated by rings 200—203. In order to obtain such a presentation the signal simulator is set in the doppler Off position. The ground clutter and other fixed targets return signals are indicated by the cross hatched areas 204.

Figure 9:
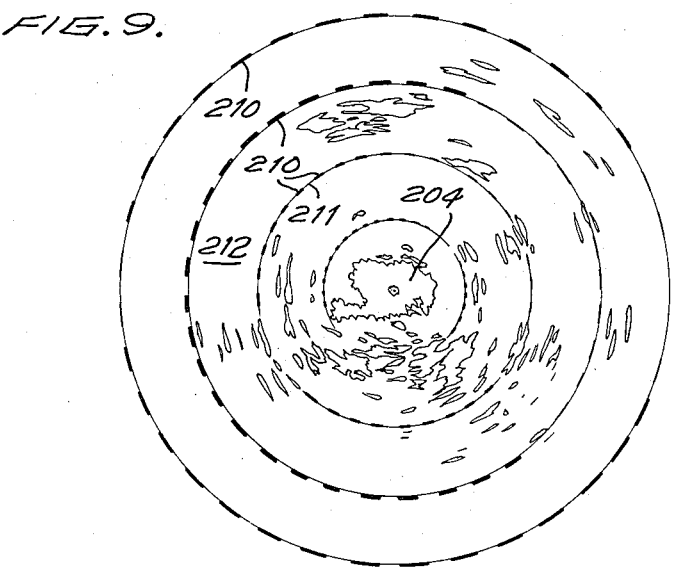
Fig. 9 is a drawing of a plan-position oscilloscope display of pulsed moving targets simulated by the signal simulator.

Fig. 9 shows the same P.P.I. presentation as Fig. 8 under MTI operation and with the signal simulator in the doppler Pulsed position. As can be seen, a large portion of the fixed clutter 204 is eliminated. The simulated moving targets are seen as bright spaced dashes 210 which increase in length with increase in range. Although not readily apparent from the diagram, the brightness of the simulated targets decreases with range due to the faster scan rate at increased range. There can also be seen the "fixed" component 211 between brighter simulated moving targets 210. In areas substantially free of clutter such as 212, the simulated targets will be brightest and the best contrast obtained. In areas of clutter the simulated targets will dim or completely disappear.

In the measurement of subclutter visibility, arm 138 (Fig. 5) is first set at the −10 db position and this causes very bright dashes to occur. The radar P.P.I. cursor is then set to cross a given ring of simulated targets in an area substantially free of clutter at the range desired and arm 138 is moved toward the −40 db position. This causes the very bright dots gradually to decrease in intensity. At the same time the phase shifter 23 (Fig. 5) is set by means of hand crank 107 until maximum contrast is obtained at the desired range. This adjustment should be checked occasionally to compensate for slow changes in the phase of the radar unit. When the db setting is such that the simulated target dots are just barely perceptible against the residue, the db reading is the subclutter visibility of the radar unit under test.

In making the above measurement, it is recommended that the radar antenna speed be so chosen that the best contrast possible is obtained at the desired range. Too slow a speed, however, causes the dashes to blend together, unless it is possible to increase the repetition rate of the radar unit.

Measurements made at close range do not take into account the rate of sub-clutter visibility deterioration with range. For this reason, it is recommended that a 15 or 20 mile range be used.

Since the simulated target pulses are spaced a fixed distance apart they may be used as a means for checking the accuracy of the range markers. Thus, if the interval between simulated pulses is 5 miles the simulated pulses should be directly superimposed upon or parallel to (if there is a fixed delay between the occurrence of the received radar pulse and the first simulated pulse) the 5 mile range markers.

As already mentioned, the frequency of the stable local oscillator may be controlled. This enables one readily to check the radar frequency. In the embodiment actually built, the stable local oscillator frequency control included a counter dial which indicated the exact setting of the frequency control adjustment. Since the setting of the stable local oscillator frequency is a function of the output frequency of the radar unit under test, it is possible to draw up a frequency correction chart relating the stable local oscillator frequency to the radar output frequency and it is thereby possible to detect changes in the radar output frequency and very easily to correct the same.

It was mentioned above in connection with the measurement of range marker accuracy that the train of simulated target pulses may be delayed in their start by a predetermined amount relative to the start of the radar pulse. In the unit built, the delay inserted was ½ microsecond. Accordingly, the first simulated target pulse should appear about 80 yards after the radar transmitter pulse and succeeding pulses should appear 80 yards after their corresponding range markers. This phenomena enables one readily to check the radar receiver gating, indicator blanking and indicator sweep timing. Thus, in an entirely accurate radar set, the zero range simulated target response should be clearly visible on the radar indicators at 80 yard range. If this does not occur then it is an indication that there is improper timing of the receiver gate, indicator blanking, or indicator sweeps. If the radar transmitter pulse length is too long, the zero range simulator target will fall on top of the transmitter pulse on the radars indicators. If the radar receiver gain can be lowered sufficiently, visible beats between the radar transmitter pulse and the first simulated target pulse can be seen on the radar A-oscilloscope atop the radar transmitter pulse.

In the 100% doppler position, a set of coherent targets is transmitted back to the radar receiver every other pulse period. This form of signal may be considered as "pure" moving target with no fixed component. By scanning the P.P.I. oscilloscope with this signal and reducing the output level of the simulator until the MTI signal trace is just discernible in clutter, the minimum detectable moving target signal (as referred to clutter level or to receiver noise level) may be determined.

Although a number of specific examples have been given of the use of the present invention, it is quite apparent that many other uses of the invention are possible, the above examples being given only by way of illustration.

It will be understood that each of the elements described above, or two or more together, may also find a useful application in other types of signal simulators differing from the types described above.

While the invention has been illustrated and described as embodied in a signal simulator especially adapted for use in connection with MTI type radar units, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A radar signal simulator comprising, in combination, receiver means adapted to be coupled to a radar unit for receiving carrier frequency radar pulses; heterodyning means coupled to said receiver means for converting received carrier frequency radar pulses to intermediate frequency pulses; generating means coupled to said heterodyning means for producing a group of retarded intermediate frequency pulses in synchronism with each of said intermediate frequency pulses respectively, respective pulses in each of said groups being spaced in time from one another by the same predetermined interval of time; phase shifting means coupled to said generating means for shifting the phase of the intermediate frequency of adjacent groups of retarded intermediate frequency pulses by a predetermined amount and for maintaining the phase of the intermediate frequency of alternate of said groups of retarded intermediate frequency pulses the same, said phase shifting means comprising a cathode follower having a capacitance cathode load impedance across which an output is taken, and means coupled to said cathode follower means for changing the transconductance thereof between two predetermined values in timed relation with the reception of said carrier frequency pulses; and means coupled to said phase shifting means for converting said groups of retarded intermediate frequency pulses to said carrier frequency.

2. A radar signal simulator comprising, in combination, receiver means adapted to be coupled to a radar unit for receiving carrier frequency radar pulses; heterodyning means coupled to said receiver means for converting received carrier frequency radar pulses to intermediate frequency pulses; generating means coupled to said heterodyning means for producing a group of retarded intermediate frequency pulses in synchronism with each of said intermediate frequency pulses respectively, respective pulses in each of said groups being spaced in time from one another by the same predetermined interval of time; phase shifting means coupled to said generating means for shifting the phase of the intermediate frequency of adjacent groups of retarded intermediate frequency pulses by a predetermined amount and for maintaining the phase of the intermediate frequency of alternate of said groups of retarded intermediate frequency pulses the same, said phase shifting means comprising a cathode follower having a capacitive cathode load impedance across which an output is taken, square wave generating means coupled to the control electrode of said cathode follower means for changing the transconductance thereof between two predetermined values, and means coupled to said square wave generating means synchronizing the same to the reception of said carrier frequency pulses; and means coupled to said phase shifting means for converting said groups of retarded intermediate frequency pulses to said carrier frequency.

3. A radar signal simulator comprising, in combination, receiver means adapted to be coupled to a radar unit for receiving carrier frequency radar pulses; heterodyning means coupled to said receiver means for converting received carrier frequency radar pulses to intermediate frequency pulses; adjustable phase shifting means coupled to said heterodyning means for shifting the phase of said intermediate frequency pulses by an adjustable amount; generating means coupled to said adjustable phase shifting means for producing a group of retarded intermediate frequency pulses in synchronism with each of said intermediate frequency pulses respectively, respective pulses in each of said groups being spaced in time from one another by the same predetermined interval of time; phase shifting means coupled to said generating means for shifting the phase of the intermediate frequency of adjacent groups of retarded intermediate frequency pulses by a predetermined amount and for maintaining the phase of the intermediate frequency of alternate of said groups of retarded intermediate frequency pulses the same, said last-named phase shifting means comprising a cathode follower having a capacitance cathode load impedance across which an output is taken, and means coupled to said cathode follower means for changing the transconductance thereof between two predetermined values in timed relation with the reception of said carrier frequency pulses; and means coupled to said last-named phase shifting means for converting said groups of retarded intermediate frequency pulses to said carrier frequency.

References Cited in the file of this patent

UNITED STATES PATENTS

| | | |
|---|---|---|
| 2,001,891 | Roosenstein | May 21, 1935 |
| 2,247,941 | Crosby | July 1, 1941 |
| 2,284,401 | Manley et al. | May 26, 1942 |
| 2,416,297 | Finch et al. | Feb. 25, 1947 |
| 2,425,600 | Coykendall | Aug. 12, 1947 |
| 2,505,525 | Clapp et al. | Apr. 25, 1950 |
| 2,518,931 | Pound | Aug. 15, 1950 |
| 2,573,734 | Sanders | Nov. 6, 1951 |
| 2,597,297 | Corson et al. | May 20, 1952 |
| 2,603,742 | Larson | July 15, 1952 |
| 2,681,986 | Wolf | June 22, 1954 |
| 2,841,785 | Cunningham et al. | July 1, 1958 |